United States Patent
Yang

(10) Patent No.: US 9,921,627 B2
(45) Date of Patent: Mar. 20, 2018

(54) CONTROL CIRCUIT FOR PROGRAMMABLE POWER SUPPLY

(71) Applicant: SEMICONDUCTOR COMPONENTS INDUSTRIES, LLC, Phoenix, AZ (US)

(72) Inventor: Ta-Yung Yang, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 917 days.

(21) Appl. No.: 14/148,955

(22) Filed: Jan. 7, 2014

(65) Prior Publication Data

US 2014/0195065 A1 Jul. 10, 2014

Related U.S. Application Data

(60) Provisional application No. 61/749,972, filed on Jan. 8, 2013.

(51) Int. Cl.
G05F 1/10 (2006.01)
G06F 1/26 (2006.01)
H02M 3/335 (2006.01)

(52) U.S. Cl.
CPC .......... G06F 1/26 (2013.01); H02M 3/33523 (2013.01)

(58) Field of Classification Search
CPC .............................. G06F 1/26; H02M 3/33523
See application file for complete search history.

(56) References Cited

U.S. PATENT DOCUMENTS

| | | | | |
|---|---|---|---|---|
| 5,973,945 A | * | 10/1999 | Balakrishnan .... | H02M 3/33576 363/80 |
| 6,023,178 A | * | 2/2000 | Shioya .............. | H02M 3/33523 327/176 |
| 6,301,135 B1 | * | 10/2001 | Mammano ........ | H02M 3/33523 363/132 |
| 6,304,462 B1 | * | 10/2001 | Balakrishnan .... | H02M 3/33507 363/21.01 |

(Continued)

FOREIGN PATENT DOCUMENTS

| | | |
|---|---|---|
| CN | 1783681 A | 6/2006 |
| CN | 1862935 A | 11/2006 |

(Continued)

*Primary Examiner* — Charles Kasenge
(74) *Attorney, Agent, or Firm* — Robert F. Hightower

(57) ABSTRACT

A control circuit for a programmable power supply is provided. It comprises a reference generation circuit generating a voltage-reference signal and a current-reference signal for regulating an output voltage and an output current of the power supply. A feedback circuit detects the output voltage and the output current for generating a feedback signal in accordance with the voltage-reference signal and the current-reference signal. A switching controller generates a switching signal coupled to switch a transformer for generating the output voltage and the output current in accordance with the feedback signal. A micro-controller controls the reference generation circuit. The micro-controller, the reference generation circuit, and the feedback circuit are equipped in the secondary side of the transformer. The switching controller is equipped in the primary side of the transformer. The control circuit can achieve good performance for the programmable power supply.

20 Claims, 10 Drawing Sheets

(56) References Cited

U.S. PATENT DOCUMENTS

| | | | |
|---|---|---|---|
| 6,313,976 B1 * | 11/2001 | Balakrishnan | H02M 3/33507 361/79 |
| 6,351,398 B1 * | 2/2002 | Balakrishnan | H02M 3/33507 363/16 |
| 6,356,464 B1 * | 3/2002 | Balakrishnan | H02M 3/33507 323/299 |
| 6,366,481 B1 * | 4/2002 | Balakrishnan | H02M 3/33507 323/284 |
| 6,462,971 B1 * | 10/2002 | Balakrishnan | H02M 3/33507 323/299 |
| 6,538,908 B2 * | 3/2003 | Balakrishnan | H02M 3/33507 323/299 |
| 6,643,153 B2 * | 11/2003 | Balakrishnan | H02M 3/33507 323/299 |
| 6,914,793 B2 * | 7/2005 | Balakrishnan | H02M 3/33507 323/299 |
| 6,977,824 B1 | 12/2005 | Yang et al. | |
| 7,016,204 B2 | 3/2006 | Yang et al. | |
| 7,253,997 B2 * | 8/2007 | Balakrishnan | H02M 3/33507 361/18 |
| 7,352,595 B2 | 4/2008 | Yang et al. | |
| 7,596,005 B2 * | 9/2009 | Balakrishnan | H02M 3/33507 323/284 |
| 7,876,587 B2 * | 1/2011 | Balakrishnan | H02M 3/33507 323/299 |
| 8,084,886 B2 * | 12/2011 | Hirahara | H02J 9/061 307/64 |
| 8,169,802 B2 * | 5/2012 | Kim | H02M 1/36 323/288 |
| 8,482,938 B2 * | 7/2013 | Balakrishnan | H02M 3/33507 363/21.01 |
| 8,587,280 B2 * | 11/2013 | Colbeck | H02M 1/4225 323/271 |
| 8,670,252 B2 * | 3/2014 | Kim | H02M 1/36 363/49 |
| 9,001,533 B2 * | 4/2015 | Park | H02M 3/33523 323/902 |
| 2002/0172055 A1 * | 11/2002 | Balakrishnan | H02M 3/33507 363/16 |
| 2003/0042437 A1 * | 3/2003 | Worley | H02M 3/33523 250/551 |
| 2003/0107359 A1 * | 6/2003 | Balakrishnan | H02M 1/32 323/299 |
| 2004/0071001 A1 * | 4/2004 | Balakrishnan | H02M 3/33507 363/95 |
| 2005/0152164 A1 * | 7/2005 | Balakrishnan | H02M 3/33507 363/95 |
| 2007/0228834 A1 * | 10/2007 | Hirahara | H02J 9/061 307/66 |
| 2008/0186747 A1 * | 8/2008 | Balakrishnan | H02M 3/33507 363/84 |
| 2008/0266907 A1 * | 10/2008 | Kim | H02M 1/36 363/21.1 |
| 2009/0129128 A1 * | 5/2009 | Hirahara | H02J 9/061 363/49 |
| 2009/0251062 A1 * | 10/2009 | Hagino | G09G 3/3406 315/276 |
| 2009/0310389 A1 * | 12/2009 | Balakrishnan | H02M 1/32 363/21.15 |
| 2011/0085360 A1 * | 4/2011 | Balakrishnan | H02M 1/32 363/50 |
| 2012/0153866 A1 * | 6/2012 | Liu | H02M 3/33561 315/294 |
| 2012/0188802 A1 * | 7/2012 | Kim | H02M 1/36 363/21.18 |
| 2012/0314459 A1 * | 12/2012 | Park | H02M 3/33523 363/21.17 |
| 2013/0020964 A1 * | 1/2013 | Nuhfer | H05B 33/0815 315/291 |
| 2013/0114175 A1 * | 5/2013 | Song | H02M 1/32 361/86 |
| 2013/0119956 A1 * | 5/2013 | Cho | G05F 5/00 323/283 |

FOREIGN PATENT DOCUMENTS

| | | |
|---|---|---|
| CN | 101232237 A | 7/2008 |
| JP | 2005-237067 A | 9/2005 |
| TW | M354791 | 4/2009 |
| TW | M364897 | 9/2009 |
| TW | M394507 | 12/2010 |
| TW | 201233030 A1 | 8/2012 |
| WO | 2012/085836 A2 | 6/2012 |

* cited by examiner ial Patent
CONTROL CIRCUIT FOR PROGRAMMABLE POWER SUPPLY

REFERENCE TO RELATED APPLICATION

This patent application is based on Provisional Patent Application Ser. No. 61/749,972, filed 8 Jan. 2013, currently pending.

BACKGROUND OF THE INVENTION

Field of Invention

The present invention relates to a programmable power supply, and more specifically relates to a control circuit for the programmable power supply.

Description of the Related Art

A programmable power supply provides a wide range of the output voltage and the output current, such as 5V~20V and 0.5 A~5 A. In general, it would be difficult to develop a cost effective solution and achieve good protections, such as over-voltage protection, over-current protection, etc. The objective of the present invention is to solve this problem and achieve good performance for the programmable power supply.

BRIEF SUMMARY OF THE INVENTION

The objective of the present invention is to provide a control circuit for controlling a programmable power supply, and it achieves good performance for the programmable power supply.

A control circuit for a programmable power supply according to the present invention comprises a reference generation circuit, a feedback circuit, a switching controller, and a micro-controller. The reference generation circuit is coupled to generate a voltage-reference signal and a current-reference signal for regulating an output voltage and an output current of the power supply. The feedback circuit is coupled to detect the output voltage and the output current for generating a feedback signal in accordance with the voltage-reference signal and the current-reference signal. The switching controller generates a switching signal coupled to switch a transformer for generating the output voltage and the output current in accordance with the feedback signal. The micro-controller is coupled to control the reference generation circuit. The micro-controller, the reference generation circuit, and the feedback circuit are equipped in the secondary side of the transformer. The switching controller is equipped in the primary side of the transformer.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF EMBODIMENTS

Figure 1:
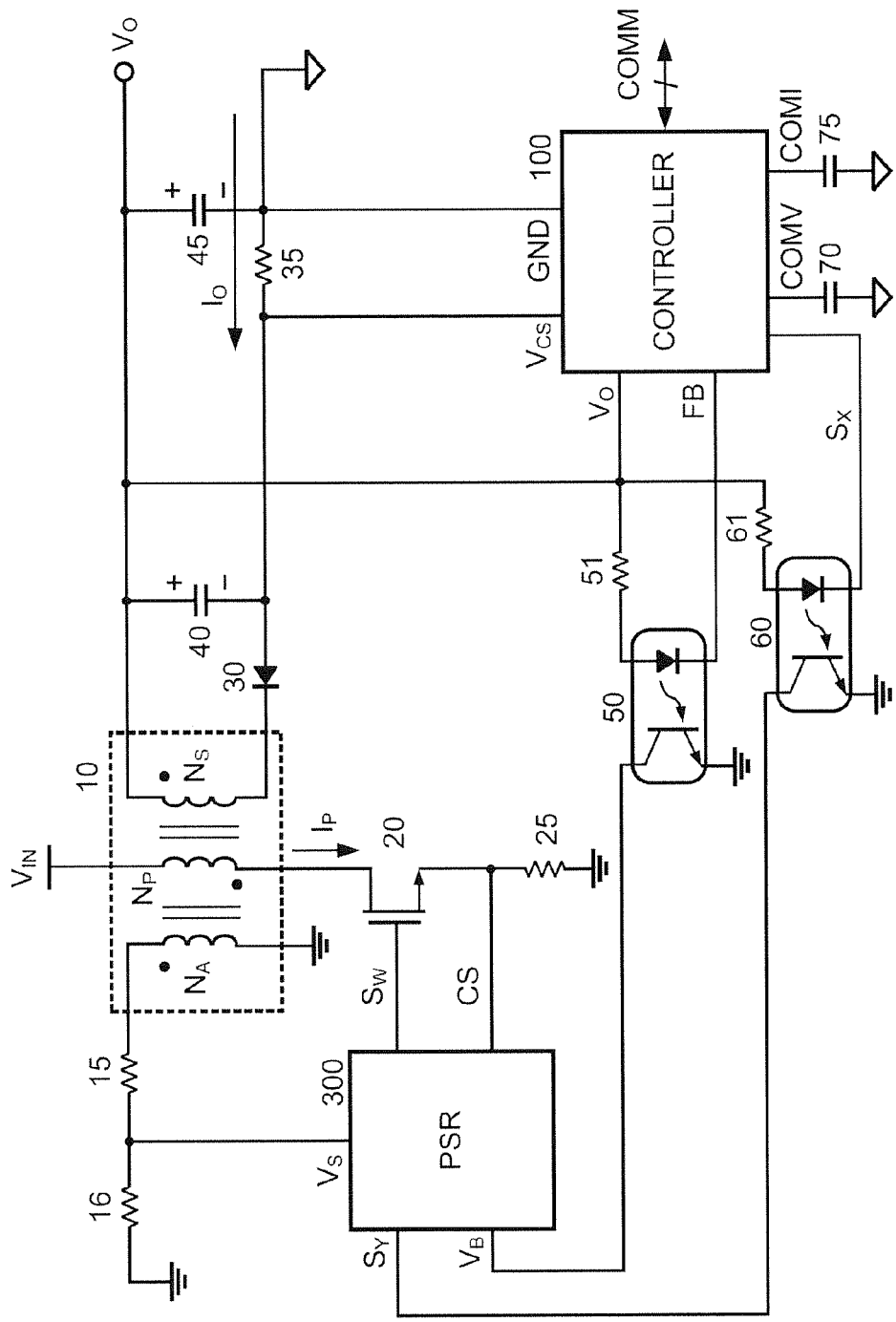
FIG. 1 is a circuit diagram of an embodiment of a programmable power supply according to the present invention.

FIG. 1 is a circuit diagram of an embodiment of a programmable power supply according to the present invention. A current-sense device, such as a resistor 35, generates a current-sense signal $V_{CS}$ in accordance with an output current $I_O$ of the programmable power supply. The current-sense signal $V_{CS}$ is correlated to the output current $I_O$. A controller 100 is coupled to receive an output voltage $V_O$ and the current-sense signal $V_{CS}$ to detect the output voltage $V_O$ and the output current $I_O$ for developing the feedback loop. The controller 100 generates a feedback signal FB coupled to a switching controller (PSR) 300 through a first signal-transfer device, such as an opto-coupler 50, for regulating the output voltage $V_O$ and the output current $I_O$.

A capacitor 70 coupled to the controller 100 is used for a voltage-loop compensation. A capacitor 75 coupled to the controller 100 is applied to compensate a current-loop for the regulation of the output current $I_O$. The controller 100 further generates a control signal $S_X$ coupled to control the switching controller 300 through a second signal-transfer device, such as an opto-coupler 60. The control signal $S_X$ is used for programming of the switching controller 300 and the protections. A resistor 51 is coupled to the opto-coupler 50 and receives the output voltage $V_O$ from an output terminal of the programmable power supply. The resistor 51 is utilized to bias the operating current of the opto-coupler 50. A resistor 61 is coupled to the opto-coupler 60 and receives the output voltage $V_O$ from the output terminal of the programmable power supply. The resistor 61 is applied to limit the current of the opto-coupler 60. The controller 100 includes a communication interface COMM, (e.g. USB-PD, IEEE UPAMD 1823, one-wire communication, etc.) for the communication with the external devices.

The opto-coupler 50 will generate a feedback signal $V_B$ coupled to the switching controller 300 in accordance with the feedback signal FB. The opto-coupler 60 will generate a control signal $S_Y$ coupled to the switching controller 300 in response to the control signal $S_X$. The switching controller 300 generates a switching signal $S_W$ for switching a primary-side winding $N_P$ of a transformer 10 and generating the output voltage $V_O$ and the output current $I_O$ at the secondary side of the transformer 10 through a secondary-side winding $N_S$, a rectifier 30, and an output capacitor 40. A capacitor 45 and the resistor 35 are coupled to the output terminal of the programmable power supply. A first terminal of the primary-side winding $N_P$ receives an input voltage $V_{IN}$. A transistor 20 is coupled to a second terminal of the primary-side winding $N_P$ to switch the transformer 10 in response to the switching signal $S_W$.

An auxiliary winding $N_A$ of the transformer 10 produces a reflected signal $V_S$ coupled to the switching controller 300 via a voltage divider developed by resistors 15 and 16. The reflected signal $V_S$ is correlated to the output voltage $V_O$. A resistor 25 is coupled between the transistor 20 and a ground to sense a switching current $I_P$ of the transformer 10 for generating a current signal CS coupled to the switching controller 300. The switching controller 300 generates the switching signal $S_W$ in accordance with the feedback signal $V_B$, the control signal $S_Y$, the reflected signal $V_S$, and the current signal CS. The controller 100 is equipped in the secondary side of the transformer 10. The switching controller 300 is equipped in the primary side of the transformer 10.

Figure 2:
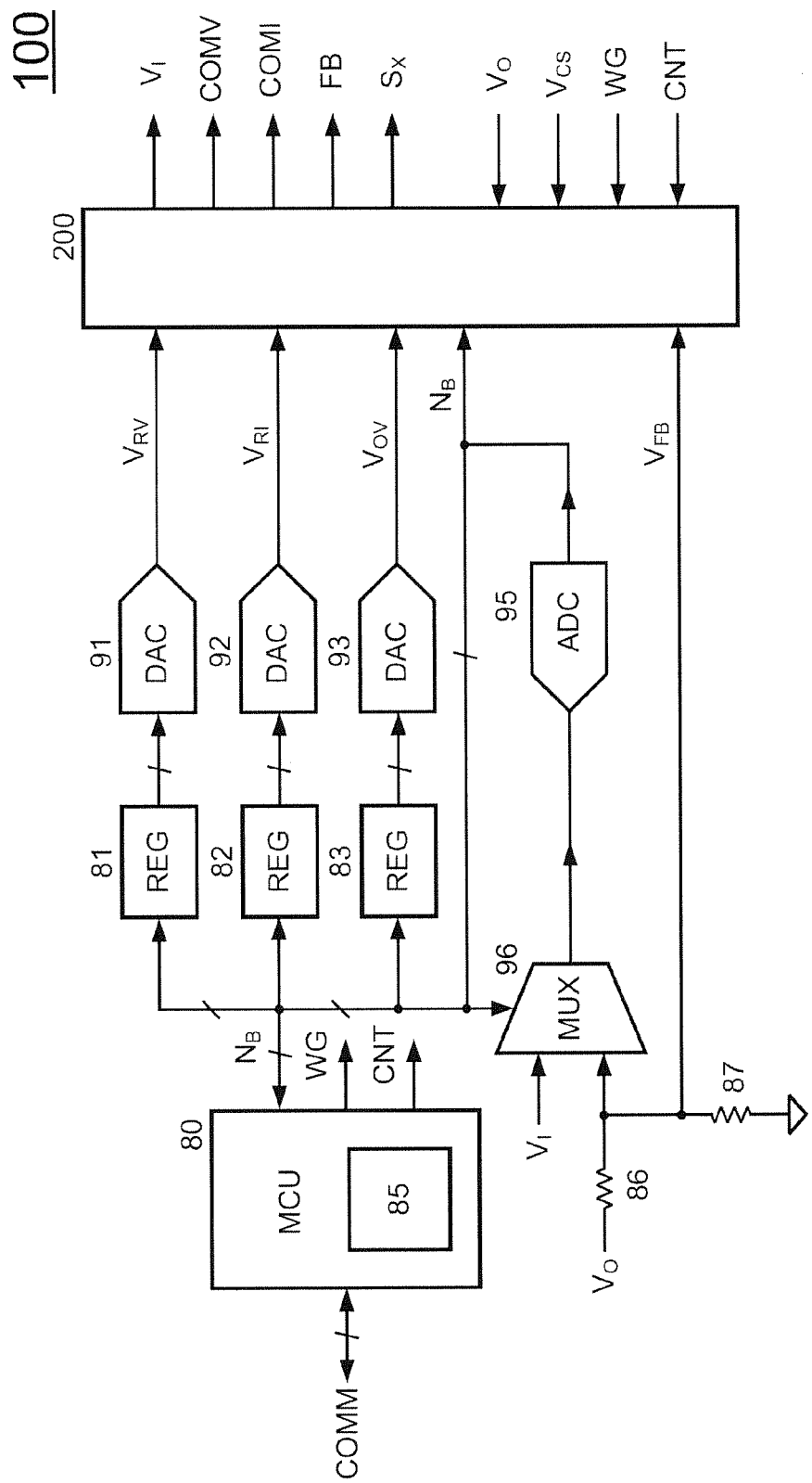
FIG. 2 is a circuit diagram of an embodiment of the controller according to the present invention.

FIG. 2 is a circuit diagram of an embodiment of the controller 100 according to the present invention. An embedded micro-controller (MCU) 80 has a memory 85 including a program memory and a data memory. The micro-controller 80 generates a watch-dog signal WG, a control signal CNT, and a control-bus signal $N_B$. The control-bus signal $N_B$ is a bi-direction signal (input or output). The micro-controller 80 includes the communication interface COMM to communicate with the host and/or the I/O devices. The control-bus signal $N_B$ is coupled to control a multiplexer (MUX) 96, an analog-to-digital converter (ADC) 95, and digital-to-analog converters (DAC) 91, 92, 93. The digital-to-analog converters 91, 92, and 93 are controlled by the micro-controller 80 through the control-bus signal $N_B$ and registers (REG) 81, 82, 83. The registers 81, 82, and 83 have reference values. The control-bus signal $N_B$ is utilized to set the reference values.

The current-sense signal $V_{CS}$ is coupled to generate a current signal $V_I$ through a feedback circuit 200. The current signal $V_I$ is connected to the multiplexer 96. The current signal $V_I$ is correlated to the output current $I_O$ shown in FIG. 1. Resistors 86 and 87 develop a voltage divider to generate a feedback signal $V_{FB}$ in accordance with the output voltage $V_O$. The feedback signal $V_{FB}$ is coupled to the multiplexer 96 and the feedback circuit 200. The output terminal of the multiplexer 96 is connected to the input terminal of the analog-to-digital converter 95. The output terminal of the multiplexer 96 outputs the current signal $V_I$ or the feedback signal $V_{FB}$ to the analog-to-digital converter 95 in response to the control-bus signal $N_B$. That is, the analog-to-digital converter 95 is coupled to detect the output voltage $V_O$ and the output current $I_O$. The output terminal of the analog-to-digital converter 95 is coupled to the micro-controller 80. Therefore, via the control-bus signal $N_B$, the micro-controller 80 can read the information of the output current $I_O$ and the output voltage $V_O$ from the analog-to-digital converter 95.

The micro-controller 80 controls the outputs of the digital-to-analog converters 91, 92, and 93. The first digital-to-analog converter 91 generates a voltage-reference signal $V_{RV}$ in response to the reference value of the register 81 for controlling the output voltage $V_O$. The second digital-to-analog converter 92 generates a current-reference signal $V_{RI}$ in response to the reference value of the register 82 for controlling the output current $I_O$. The third digital-to-analog converter 93 generates an over-voltage reference threshold $V_{OV}$ in response to the reference value of the register 83 for the over-voltage protection. Therefore, the digital-to-analog converters 91, 92, and 93 are operated as a reference generation circuit to generate the voltage-reference signal $V_{RV}$, the current-reference signal $V_{RI}$, and the over-voltage reference threshold $V_{OV}$.

The micro-controller 80 will control the over-voltage reference threshold $V_{OV}$ in accordance with the level of the output voltage $V_O$. The registers 81, 82, and 83 will be reset to provide an initial value in response to the power-on of the power supply. For example, the initial value of the first register 81 will be utilized to produce a minimum value of the voltage-reference signal $V_{RV}$ that is used to generate a 5V output voltage $V_O$. The initial value of the second register 82 will be utilized to produce a minimum value of the current-reference signal $V_{RI}$ that is used to generate a 0.5 A output current $I_O$. In other words, the voltage-reference signal $V_{RV}$, the current-reference signal $V_{RI}$, and the over-voltage reference threshold $V_{OV}$ will be reset to the initial value in response to the power-on of the power supply.

The feedback circuit 200 generates a voltage-feedback signal COMV, a current-feedback signal COMI, the feedback signal FB, and the control signal $S_X$ in response to the voltage-reference signal $V_{RV}$, the current-reference signal $V_{RI}$, the over-voltage reference threshold $V_{OV}$, the output voltage $V_O$, the feedback signal $V_{FB}$, the current-sense signal $V_{CS}$, the watch-dog signal WG, the control signal CNT, and the control-bus signal $N_B$. The feedback circuit 200 is coupled to detect the output voltage $V_O$ and the output current $I_O$ for generating the feedback signal FB in accordance with the feedback signal $V_{FB}$, the current-sense signal $V_{CS}$, the voltage-reference signal $V_{RV}$, and the current-reference signal $V_{RI}$. The feedback signal FB is transferred from the feedback circuit 200 to the switching controller 300 by the opto-coupler 50 (as shown in FIG. 1).

Figure 3:
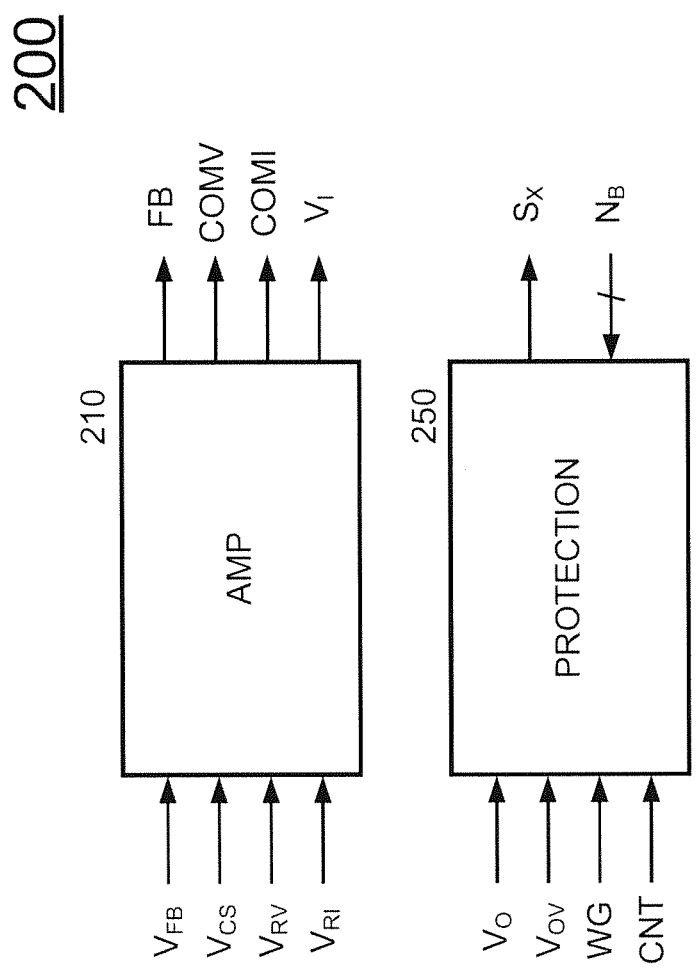
FIG. 3 is a block diagram of an embodiment of the feedback circuit according to the present invention.

FIG. 3 is a block diagram of an embodiment of the feedback circuit 200 according to the present invention. It includes an error-amplifier circuit (AMP) 210 and a protection circuit (PROTECTION) 250. The error-amplifier circuit 210 generates the voltage-feedback signal COMV, the current-feedback signal COMI, the feedback signal FB, and the current signal $V_I$ in accordance with the voltage-reference signal $V_{RV}$, the current-reference signal $V_{RI}$, the current-sense signal $V_{CS}$, and the feedback signal $V_{FB}$. The protection circuit 250 generates the control signal $S_X$ in response to the over-voltage reference threshold $V_{OV}$, the output voltage $V_O$, the watch-dog signal WG, the control signal CNT, and the control-bus signal $N_B$.

Figure 4:
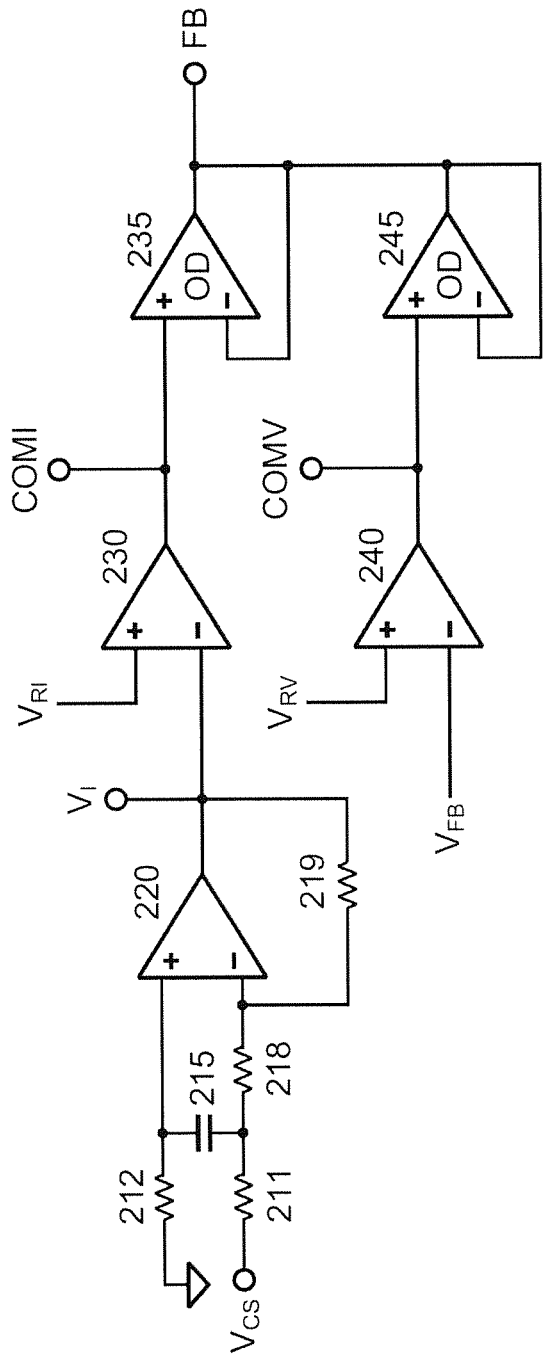
FIG. 4 is a circuit diagram of an embodiment of the error-amplifier circuit according to the present invention.

FIG. 4 is a circuit diagram of an embodiment of the error-amplifier circuit 210 according to the present invention. It includes resistors 211, 212, and a capacitor 215 coupled to receive the current-sense signal $V_{CS}$ and filter the noise. A first terminal of the resistor 211 is coupled to receive the current-sense signal $V_{CS}$. A first terminal of the resistor 212 is coupled to the ground. The capacitor 215 is coupled between second terminals of the resistors 211 and 212. The capacitor 215 is further connected between a positive input terminal of an operational amplifier 220 and the second terminal of the resistor 211. Resistors 218 and 219 determine the gain of the operational amplifier 220. The resistor 218 is coupled between the second terminal of the resistor 211 and a negative input terminal of the operational amplifier 220. The resistor 219 is coupled between the negative input terminal and an output terminal of the operational amplifier 220. The operational amplifier 220 generates the current signal $V_I$ by amplifying the current-sense signal $V_{CS}$.

An error amplifier 230 generates the current-feedback signal COMI in accordance with the current signal $V_I$ and the current-reference signal $V_{RI}$. The current signal $V_I$ is coupled to a negative input terminal of the error amplifier 230. The current-reference signal $V_{RI}$ is supplied with a positive input terminal of the error amplifier 230. An output terminal of the error amplifier 230 outputs the current-feedback signal COMI. Therefore, the error amplifier 230 generates the current-feedback signal COMI in accordance with the output current $I_O$ (as shown in FIG. 1) and the current-reference signal $V_{RI}$. The current-feedback signal COMI is connected to the capacitor 75 (as shown in FIG. 1) for the loop-compensation.

An error amplifier 240 generates the voltage-feedback signal COMV in accordance with the feedback signal $V_{FB}$ and the voltage-reference signal $V_{RV}$. The feedback signal $V_{FB}$ is coupled to a negative input terminal of the error amplifier 240. The voltage-reference signal $V_{RV}$ is supplied with a positive input terminal of the error amplifier 240. An output terminal of the error amplifier 240 outputs the voltage-feedback signal COMV. Therefore, the error amplifier 240 generates the voltage-feedback signal COMV in accordance with the output voltage $V_O$ (as shown in FIG. 1) and the voltage-reference signal $V_{RV}$. The voltage-feedback signal COMV is connected to the capacitor 70 (as shown in FIG. 1) for the loop-compensation.

The voltage-feedback signal COMV is further connected to a positive input terminal of a buffer (OD) 245 to generate the feedback signal FB. A negative input terminal of the buffer 245 is coupled to an output terminal of the buffer 245. The current-feedback signal COMI is further connected to a positive input terminal of a buffer 235. A negative input terminal of the buffer 235 is coupled to an output terminal of the buffer 235. The output terminal of the buffer 245 is parallel connected to the output terminal of the buffer 235. The buffer 235 and the buffer 245 have the open-drain output, thus they can be wire-OR connected.

Figure 5:
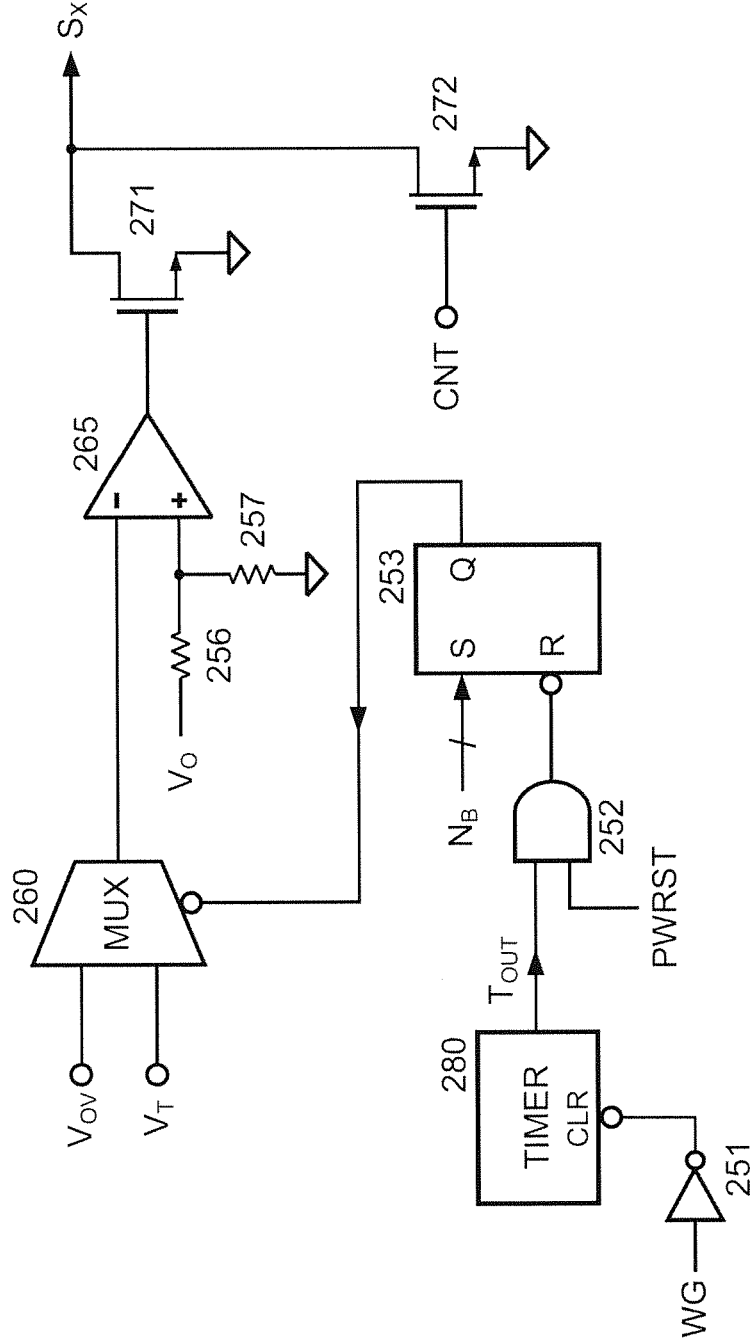
FIG. 5 is a circuit diagram of an embodiment of the protection circuit according to the present invention.

FIG. 5 is a circuit diagram of an embodiment of the protection circuit 250 according to the present invention. The watch-dog signal WG is coupled to clear a watch-dog timer (TIMER) 280 via an inverter 251. The watch-dog timer 280 will generate an expired signal $T_{OUT}$ (logic-low level) if the watch-dog signal WG is not generated (logic-low level) in time periodically. The expired signal $T_{OUT}$ can be regarded as a time-out signal. The expired signal $T_{OUT}$ and a power-on reset signal PWRST are coupled to a reset input terminal R of a RS flip-flop 253 via an AND gate 252 to reset the RS flip-flop 253. The RS flip-flop 253 is set by the micro-controller 80 (as shown in FIG. 2) through the control-bus signal $N_B$. The control-bus signal $N_B$ is coupled to a set input terminal S of the RS flip-flop 253.

The over-voltage reference threshold $V_{OV}$ and a threshold $V_T$ are coupled to a multiplexer (MUX) 260. The multiplexer 260 outputs the over-voltage reference threshold $V_{OV}$ or the threshold $V_T$ as an over-voltage threshold for the over-voltage protection. Therefore, the multiplexer 260 is associated with the third register 83 and the third digital-to-analog converter 93 (as shown in FIG. 2) as a threshold generation circuit for generating the over-voltage threshold. The over-voltage reference threshold $V_{OV}$ or the threshold $V_T$ is coupled to a comparator 265 via the multiplexer 260. The multiplexer 260 is controlled by an output terminal Q of the RS flip-flop 253. When the RS flip-flop 253 is set, the over-voltage reference threshold $V_{OV}$ will be outputted to a negative input terminal of the comparator 265. If the RS flip-flop 253 is reset, the threshold $V_T$ will be outputted to the negative input terminal of the comparator 265 for the over-voltage protection. The output voltage $V_O$ is coupled to a positive input terminal of the comparator 265 through a voltage divider developed by resistors 256 and 257.

The threshold $V_T$ is a minimum threshold for the over-voltage protection. The over-voltage threshold of the over-voltage protection is programmable by the micro-controller 80 through programming the level of the over-voltage reference threshold $V_{OV}$. This over-voltage threshold will be reset as a minimum value (the threshold $V_T$) if the watch-dog signal WG is not generated in time periodically. For example, the over-voltage threshold will be programmed to 14V for a 12V output voltage $V_O$, and the over-voltage threshold will be programmed to 6V for a 5V output voltage $V_O$. If the watch-dog signal WG is not generated by the micro-controller 80 timely, then the over-voltage threshold will be reset to 6V even the output voltage $V_O$ is set as 12V, which will protect the power supply from abnormal operation when the micro-controller 80 is operated incorrectly. Further, the over-voltage threshold also will be reset as the minimum value in response to the power-on of the power supply.

An output signal of the comparator 265 is coupled to a gate of a transistor 271. Once the output voltage $V_O$ is higher than the over-voltage threshold (the over-voltage reference threshold $V_{OV}$ or the threshold $V_T$), the output signal of the comparator 265 drives the transistor 271 for generating the control signal $S_X$ (logic-low level). A source of the transistor 271 is coupled to the ground. A drain of the transistor 271 outputs the control signal $S_X$. Accordingly, the comparator 265 is utilized to compare the output voltage $V_O$ with the over-voltage threshold for the over-voltage protection. The comparator 265 is associated with the transistor 271 as an over-voltage protection circuit to generate the control signal $S_X$. The control signal $S_X$ serves as an over-voltage signal. As shown in FIG. 1, the control signal $S_X$ is sent to the switching controller 300 through the opto-coupler 60 to disable the switching signal $S_W$ for the over-voltage protection.

The control signal CNT from the micro-controller 80 also drives a transistor 272 to generate the control signal $S_X$. The control signal CNT is coupled to a gate of the transistor 272. A source of the transistor 272 is coupled to the ground. A drain of the transistor 272 outputs the control signal $S_X$. The outputs of the transistors 271 and 272 are parallel connected. Thus, the control signal $S_X$ is used for the protection of the power supply and the control of the micro-controller 80.

Figure 6:
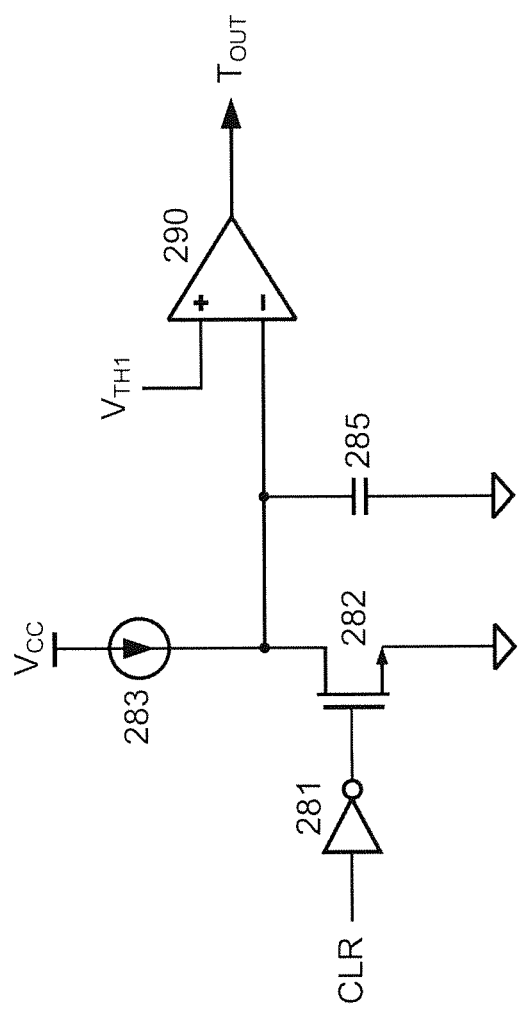
FIG. 6 is a reference circuit schematic of the watch-dog timer according to the present invention.

FIG. 6 is a reference circuit schematic of the watch-dog timer 280 according to the present invention. As shown in FIG. 6, the watch-dog timer 280 comprises an inverter 281, a transistor 282, a constant current source 283, a capacitor 285, and a comparator 290. A first terminal of the constant current source 283 is coupled to a supply voltage $V_{CC}$. A second terminal of the constant current source 283 is coupled to a drain of the transistor 282 and a first terminal of the capacitor 285. A source of the transistor 282 and a second terminal of the capacitor 285 are coupled to the ground. An input signal CLR of the watch-dog timer 280 is coupled to a gate of the transistor 282 through the inverter 281 to control the transistor 282. In this embodiment, the input signal CLR is the inversed watch-dog signal /WG generated from the inverter 251 shown in FIG. 5. A negative input terminal of the comparator 290 is coupled to the first terminal of the capacitor 285. A positive input terminal of the comparator 290 is coupled to receive a threshold $V_{TH1}$. The comparator 290 compares the voltage of the capacitor 285 with the threshold $V_{TH1}$ for generating the expired signal $T_{OUT}$.

The constant current source 283 is utilized to charge the capacitor 285. The input signal CLR of the watch-dog timer 280 is coupled to discharge the capacitor 285 via the inverter 281 and the transistor 282. If the capacitor 285 is not discharged by the input signal CLR timely, then the comparator 290 will generate the expired signal $T_{OUT}$ when the voltage of the capacitor 285 is charged and higher than the threshold $V_{TH1}$. At this time, the level of the expired signal $T_{OUT}$ is the logic-low level.

Figure 7:
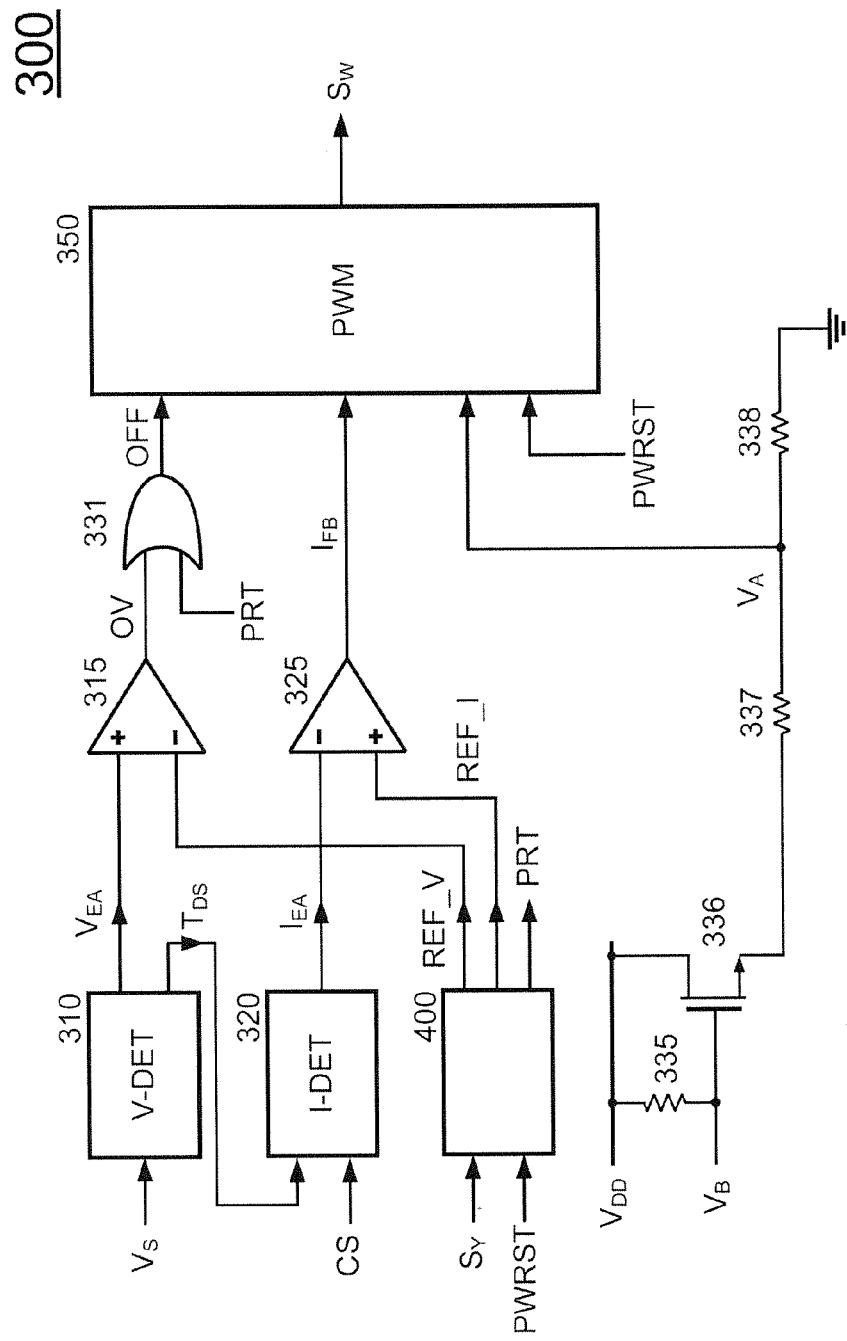
FIG. 7 is a circuit diagram of an embodiment of the switching controller according to the present invention.

FIG. 7 is a circuit diagram of an embodiment of the switching controller 300 according to the present invention. It includes a voltage detection circuit (V-DET) 310 to generate a voltage-loop signal $V_{EA}$ and a discharge time signal $T_{DS}$ in response to the reflected signal $V_S$. The voltage-loop signal $V_{EA}$ is correlated to the output voltage $V_O$ shown in FIG. 1. The discharge time signal $T_{DS}$ is correlated to the demagnetizing time of the transformer 10 shown in FIG. 1. Therefore, the switching controller 300 is coupled to detect the output voltage $V_O$ by detecting the reflected signal $V_S$ of the transformer 10. A current detection circuit (I-DET) 320 generates a current-loop signal $T_{EA}$ in response to the current signal CS and the discharge time signal $T_{DS}$. The voltage detection circuit 310 and the current detection circuit 320 are related to the technology of the primary side regulation (PSR) of the power converter. The detail of the skill of the primary side regulation can be found in the prior arts of "Control circuit for controlling output current at the primary side of a power converter", U.S. Pat. No. 6,977,824; "Close-loop PWM controller for primary-side controlled power converters", U.S. Pat. No. 7,016,204; and "Primary-side controlled switching regulator", U.S. Pat. No. 7,352,595; etc.

The voltage-loop signal $V_{EA}$ is coupled to a positive input terminal of a comparator 315. A reference signal REF_V is supplied with a negative input terminal of the comparator 315. The voltage-loop signal $V_{EA}$ is coupled to the comparator 315 for generating an over-voltage signal OV when the voltage-loop signal $V_{EA}$ is higher than the reference signal REF_V. The current-loop signal $I_{EA}$ is coupled to a negative input terminal of an amplifier 325. A reference signal REF_I is supplied with a positive input terminal of the amplifier 325. The current-loop signal $I_{EA}$ associated with the reference signal REF_I generates a current feedback signal $I_{FB}$ for generating the switching signal $S_W$. Therefore, the switching controller 300 generates the switching signal $S_W$ in accordance with the reference signal REF_I.

A programmable circuit 400 is coupled to generate the reference signals REF_V, REF_I, and a protection signal PRT in response to the control signal $S_Y$ and the power-on reset signal PWRST. The reference signal REF_V is operated as an over-voltage threshold signal for the over-voltage protection. This over-voltage protection is developed by the detection of the reflected signal $V_S$. The reference signal REF_I is operated as a current limit threshold signal for limiting the output current $I_O$ (as shown in FIG. 1) of the power supply. Because the control signal $S_Y$ represents the control signal $S_X$ from the micro-controller 80 (as shown in FIG. 2), the reference signals REF_V and REF_I are controlled by the control signal $S_X$ for the over-voltage protection of the output voltage $V_O$ and the current limit of the output current $I_O$.

The protection signal PRT and the over-voltage signal OV are coupled to generate an off signal OFF via an OR gate 331. A resistor 335 is utilized to pull high the feedback signal $V_B$. The feedback signal $V_B$ is coupled to generate a secondary feedback signal $V_A$ through a level-shift circuit. The level-shift circuit comprises a transistor 336, and resistors 335, 337, 338. A drain of the transistor 336 is coupled to a supply voltage $V_{DD}$. A first terminal of the resistor 335 is coupled to the supply voltage $V_{DD}$ and the drain of the transistor 336. A second terminal of the resistor 335 is coupled to a gate of the transistor 336 and the feedback signal $V_B$. The gate of the transistor 336 is further coupled to receive the feedback signal $V_B$. A source of the transistor 336 is coupled to a first terminal of the resistor 337. The resistor 338 is coupled between a second terminal of the resistor 337 and the ground. The secondary feedback signal $V_A$ is generated at the joint of the resistors 337 and 338. The secondary feedback signal $V_A$ is correlated to the feedback signal $V_B$.

A PWM circuit (PWM) 350 generates the switching signal $S_W$ in response to the secondary feedback signal $V_A$, the current feedback signal $I_{FB}$, the off signal OFF, and the power-on reset signal PWRST.

Figure 8:
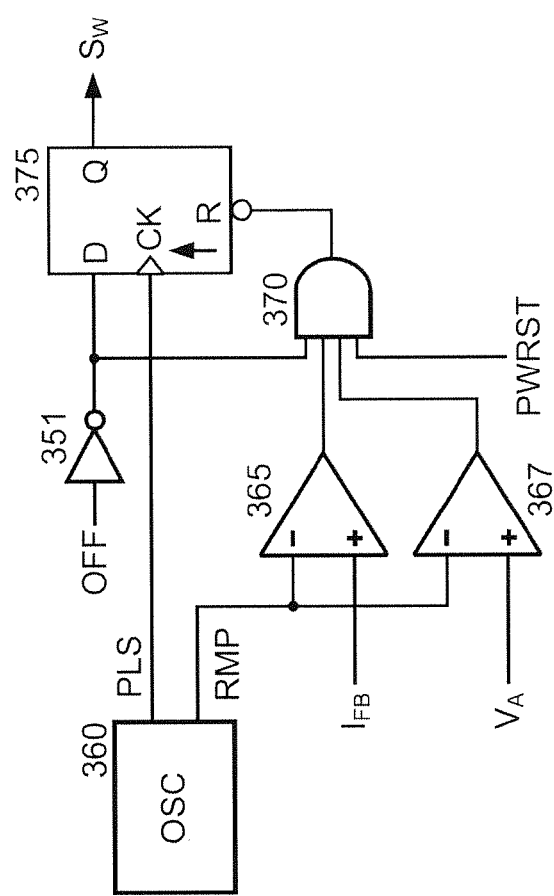
FIG. 8 is a reference circuit schematic of the PWM circuit according to the present invention.

FIG. 8 is a reference circuit schematic of the PWM circuit 350 according to the present invention. An oscillator (OSC) 360 generates a clock signal PLS and a ramp signal RMP. The clock signal PLS is coupled to a clock input terminal CK of a flip-flop 375. An output terminal Q of the flip-flop 375 outputs the switching signal $S_W$. The off signal OFF is coupled to an input terminal D of the flip-flop 375 via an inverter 351.

The ramp signal RMP is coupled to negative input terminals of comparators 365 and 367. The current feedback signal $I_{FB}$ is coupled to a positive input terminal of the comparator 365 to compare with the ramp signal RMP. The secondary feedback signal $V_A$ is coupled to a positive input terminal of the comparator 367 to compare with the ramp signal RMP. Output terminals of the comparators 365 and 367 are coupled to input terminals of an AND gate 370. The off signal OFF is further coupled to the input terminal of the AND gate 370 though the inverter 351. The power-on reset signal PWRST is also coupled to the input terminal of the AND gate 370. An output terminal of the AND gate 370 is coupled to a reset input terminal R of the flip-flop 375.

The clock signal PLS periodically enables the switching signal $S_W$ via the flip-flop 375. The switching signal $S_W$ will be disabled once the ramp signal RMP is higher than the current feedback signal $I_{FB}$ in the comparator 365 or the secondary feedback signal $V_A$ in the comparator 367. The off signal OFF is also coupled to disable the switching signal $S_W$ through the inverter 351 and the AND gate 370. The power-on reset signal PWRST is also coupled to disable the switching signal $S_W$ through the AND gate 370.

Figure 9:
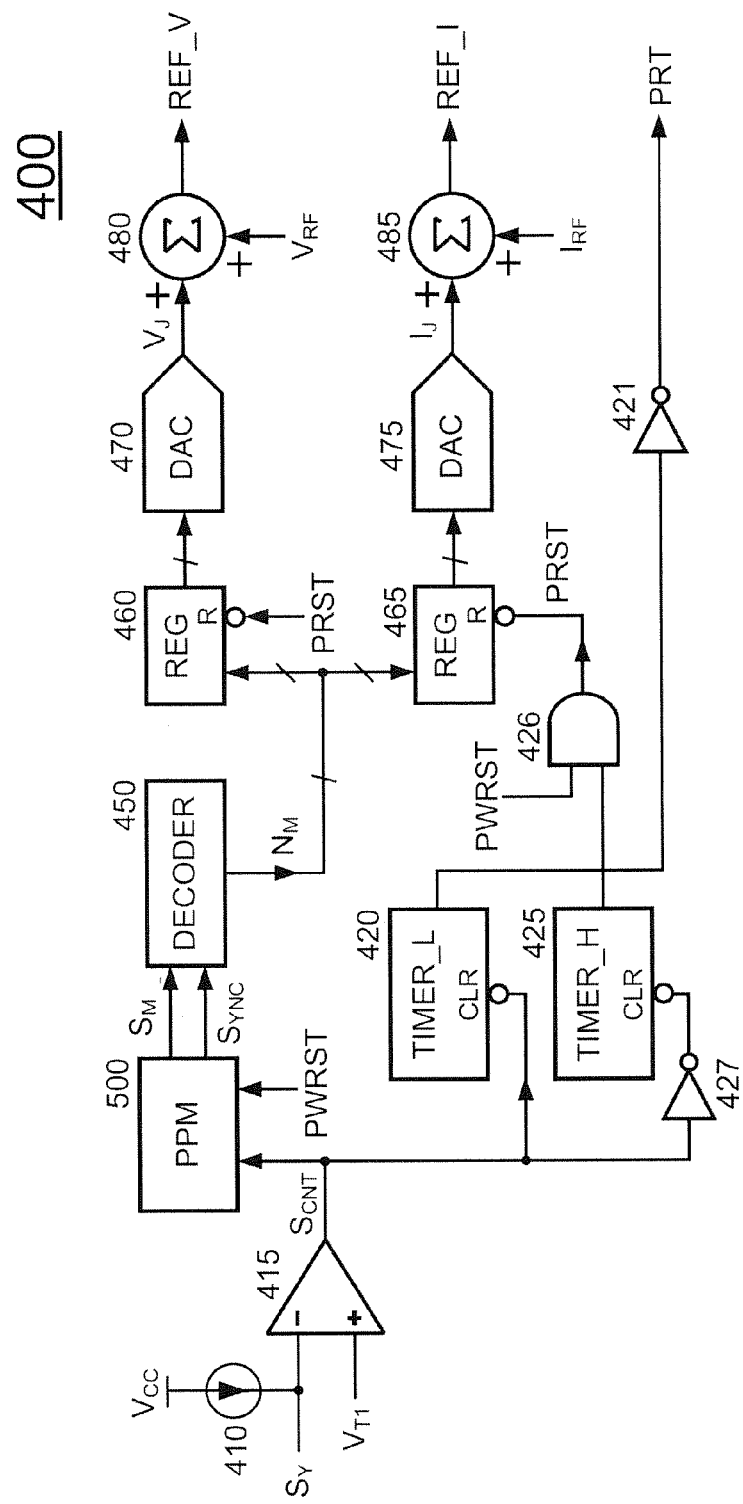
FIG. 9 is a circuit diagram of an embodiment of the programmable circuit according to the present invention.

FIG. 9 is a circuit diagram of an embodiment of the programmable circuit 400 according to the present invention. A current source 410 is connected to pull high the control signal $S_Y$. The current source 410 is coupled from the supply voltage $V_{CC}$ to a negative input terminal of a comparator 415. The control signal $S_Y$ is also coupled to the negative input terminal of the comparator 415. The comparator 415 will generate a pulse signal $S_{CNT}$ once the control signal $S_Y$ is lower than a threshold $V_{T1}$ supplied with a positive input terminal of the comparator 415.

A pulse-position modulation circuit (PPM) 500 generates a demodulated signal $S_M$ and a synchronous signal $S_{YNC}$ in response to the pulse signal $S_{CNT}$. The pulse signal $S_{CNT}$ indicates the control signal $S_X$ of the controller 100 (as shown in FIG. 2). The demodulated signal $S_M$ and the synchronous signal $S_{YNC}$ are coupled to a digital-decoder (DECODER) 450 to generate a digital data $N_M$. The digital data $N_M$ is stored into a register (REG) 460 and a register (REG) 465. The register 460 is coupled to output the digital data $N_M$ to a digital-to-analog converter (DAC) 470 for generating a voltage-adjust signal $V_J$. An add circuit 480 generates the reference signal REF_V by adding a reference signal $V_{RF}$ and the voltage-adjust signal $V_J$. The register 465 is coupled to output the digital data $N_M$ to a digital-to-analog converter (DAC) 475 for generating a current-adjust signal $I_J$. An add circuit 485 generates the reference signal REF_I by adding a reference signal $I_{RF}$ and the current-adjust signal $I_J$. In other words, the digital data $N_M$ is utilized to generate the voltage-adjust signal $V_J$ and the current-adjust signal $I_J$ for generating the reference signals REF_V and REF_I.

Therefore, the reference signal REF_V and the reference signal REF_I are programmable by the micro-controller 80 of the controller 100. The reflected signal $V_S$ of the transformer 10 (as shown in FIG. 1) is used for the over-voltage protection in the primary side of the transformer 10. The threshold (reference signal REF_V) of this over-voltage protection (for output voltage $V_O$) is programmable by the controller 100 in the secondary side of the transformer 10. Furthermore, the current limit (reference signal REF_I) of the output current $I_O$ (as shown in FIG. 1) can be programmed by the controller 100 in the secondary side of the transformer 10.

The pulse signal $S_{CNT}$ is further coupled to a timer (TIMER_L) 420 for detecting the pulse width of the pulse signal $S_{CNT}$. That is, the timer 420 is used to detect the logic-low period of the control signal $S_X$ shown in FIG. 1. The protection signal PRT will be generated by the timer 420 via an inverter 421 if the pulse width of the pulse signal $S_{CNT}$ is over a period $T_{OV}$. The circuit of the timer 420 can be the same as the circuit of the watch-dog timer 280 shown in FIG. 6. The current of the constant current source 283, the capacitance of the capacitor 285, and the value of the threshold $V_{TH1}$ determine the period $T_{OV}$.

This protection signal PRT is coupled to the OR gate 331 (as shown in FIG. 7) to generate the off signal OFF for disabling the switching signal $S_W$. Because the control signal $S_X$ (the pulse signal $S_{CNT}$) shown in FIG. 5 will be generated greater than the period $T_{OV}$ when the over-voltage of the output voltage $V_O$ is detected by the controller 100 in the secondary side of the transformer 10 (as shown in FIG. 1), the switching signal $S_W$ will be disabled by the switching controller 300 once the over-voltage of the output voltage $V_O$ is detected.

Another timer (TIMER_H) 425 is coupled to receive the pulse signal $S_{CNT}$ through an inverter 427. An output terminal of the timer 425 is coupled to an AND gate 426. The timer 425 will generate a reset signal PRST via the AND gate 426 once the pulse signal $S_{CNT}$ is not generated over a specific period $T_{OT}$. The circuit of the timer 425 can be the same as the circuit of the watch-dog timer 280 shown in FIG. 6. The current of the constant current source 283, the capacitance of the capacitor 285, and the value of the threshold $V_{TH1}$ determine the period $T_{OT}$. The power-on reset signal PWRST is also coupled to the AND gate 426 to generate the reset signal PRST through the AND gate 426. The reset signal PRST is coupled to clear the registers 460 and 465 for resetting the value of the voltage-adjust signal $V_J$ and the current-adjust signal $I_J$ to the zero.

Therefore, the reference signal REF_V will be set to a minimum value (reference signal $V_{RF}$), that is the initial value, for the over-voltage protection once the control signal $S_X$ is not generated in time by the controller 100 or the power supply is powered on. Besides, the reference signal REF_I will be set to a minimum value (reference signal $I_{RF}$), that is the initial value, for limiting the output current $I_O$ once the control signal $S_X$ is not generated in time by the controller 100 or the power supply is powered on. Therefore, if the micro-controller 80 is not operated properly, then the threshold (reference signal REF_V) for the over-voltage protection and the threshold (reference signal REF_I) for the output current limit will be reset to the minimum value for the protection.

Consequently, the control signal $S_X$ generated by the controller 100 is used for, (1) the over-voltage protection when the over-voltage is detected in the controller 100;

(2) the communication for setting the over-voltage threshold (REF_V) and the current limit threshold (REF_I) in the switching controller 300;

(3) resetting the timer 425 in the switching controller 300 to ensure the controller 100 is operated properly, otherwise the over-voltage threshold (REF_V) and the current limit threshold (REF_I) of the switching controller 300 will be reset to the minimum value for protecting the power supply.

Figure 10:
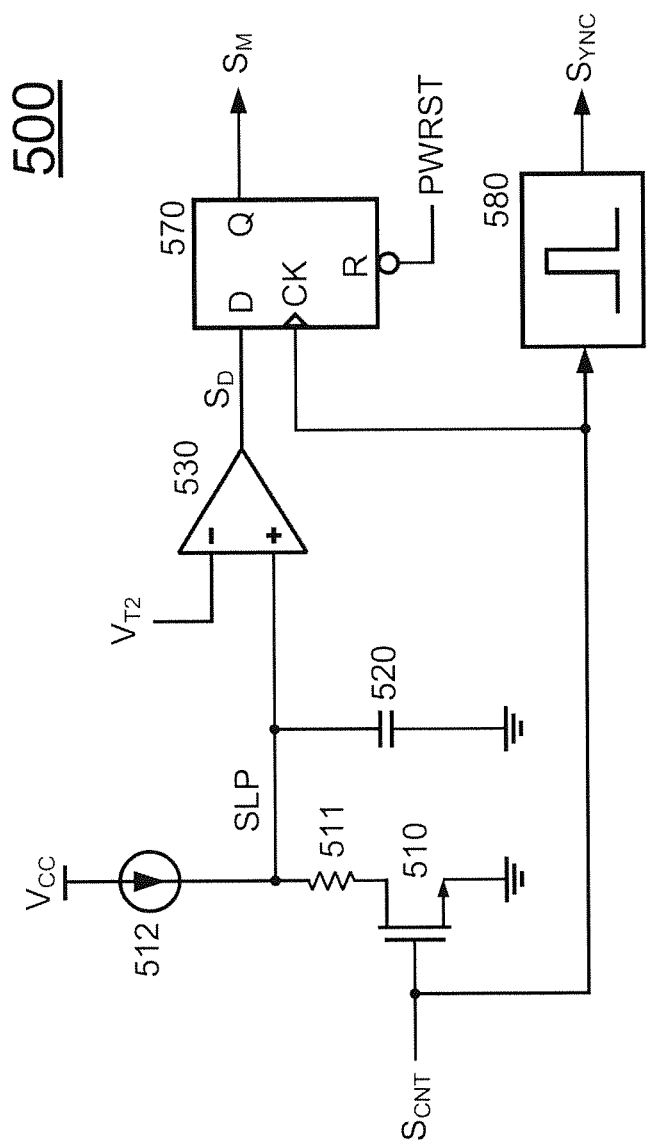
FIG. 10 is a circuit diagram of an embodiment of the pulse-position modulation circuit according to the present invention.

FIG. 10 is a circuit diagram of an embodiment of the pulse-position modulation circuit 500 according to the present invention. It operates as a de-modulator for an input signal with the pulse-position modulation, such as the control signals $S_X$, $S_Y$, and the pulse signal $S_{CNT}$. A current source 512 is coupled from the supply voltage $V_{CC}$ to a first terminal of a capacitor 520 to charge the capacitor 520. A second terminal of the capacitor 520 is coupled to the ground. A resistor 511 is coupled between the first terminal of the capacitor 520 and a drain of a transistor 510. A source of the transistor 510 is coupled to the ground. The pulse signal $S_{CNT}$ is coupled to a gate of the transistor 510 to drive the transistor 510. The pulse signal $S_{CNT}$ is coupled to discharge the capacitor 520 through the transistor 510 and the resistor 511. A slope signal SLP is thus generated at the capacitor 520.

A positive input terminal of a comparator 530 is coupled to the first terminal of the capacitor 520. A threshold $V_{T2}$ is supplied with a negative input terminal of the comparator 530. The comparator 530 will generate a data signal $S_D$ as a logic-high level once the slope signal SLP is higher than the threshold $V_{T2}$. The data signal $S_D$ is coupled to an input terminal D of a flip-flop 570. The pulse signal $S_{CNT}$ is further coupled to a clock input terminal CK of the flip-flop 570. The data signal $S_D$ will be latched into the flip-flop 570 in response to the pulse signal $S_{CNT}$ for generating the demodulated signal $S_M$ at an output terminal Q of the flip-flop 570. The power-on reset signal PWRST is coupled to a reset input terminal R of the flip-flop 570 to reset the flip-flop 570. The pulse signal $S_{CNT}$ is further coupled to generate the synchronous signal $S_{YNC}$ through a pulse generation circuit 580. The demodulated signal $S_M$ is generated in accordance with the pulse position of the control signal $S_X$.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A control circuit for a programmable power supply, comprising:
    the control circuit configured to be coupled to a secondary side of the power supply, the control circuit configured to detect an output voltage and an output current formed on the secondary side of the power supply;

a reference generation circuit configured to generate a voltage-reference signal and a current-reference signal for regulating the output voltage and the output current;

a feedback circuit configured to detect the output voltage and the output current and form a feedback signal in accordance with the voltage-reference signal and the current-reference signal wherein the feedback circuit is configured to change the feedback signal in response to the output voltage and to change the feedback signal in response to the output current;

a micro-controller coupled to control the reference generation circuit; and the control circuit configured to provide the feedback signal for use by a switching controller on a primary side of the power supply for generating a switching signal to switch a transformer for generating the output voltage and the output current in accordance with the feedback signal.

2. The circuit as claimed in claim 1, wherein the micro-controller has a communication interface for the communication.

3. The circuit as claimed in claim 1, further comprising:
a threshold generation circuit generating an over-voltage threshold for an over-voltage protection; and
an over-voltage protection circuit coupled to generate an over-voltage signal by comparing the output voltage and the over-voltage threshold:
wherein the over-voltage signal is coupled to disable the switching signal.

4. The circuit as claimed in claim 3, wherein the switching controller will disable the switching signal once the over-voltage signal is generated over a period.

5. The circuit as claimed in claim 3, wherein the over-voltage threshold will be reset to a minimum threshold in response to a power-on of the power supply.

6. The circuit as claimed in claim 3, further comprising:
a watch-dog timer coupled to receive a watch-dog signal from the micro-controller;
wherein the watch-dog timer will generate a time-out signal if the watch-dog signal is not generated in time periodically; the over-voltage threshold will be reset to a minimum threshold in response to the time-out signal.

7. The circuit as claimed in claim 1, wherein the reference generation circuit comprises:
a first digital-to-analog converter coupled to generate the voltage-reference signal: and
a second digital-to-analog converter coupled to generate the current-reference signal.

8. The circuit as claimed in claim 1, further comprising:
an analog-to-digital converter coupled to detect the output voltage and the output current of the power supply;
wherein an output of the analog-to-digital converter is coupled to the micro-controller.

9. The circuit as claimed in claim 1, wherein the micro-controller generates a control signal coupled to control an over-voltage threshold signal in the switching controller for an over-voltage protection of the output voltage.

10. The circuit as claimed in claim 9, wherein the over-voltage threshold signal will be reset to an initial value if the control signal is not generated in time.

11. The circuit as claimed in claim 9, wherein the control signal is modulated by a pulse position modulation.

12. The circuit as claimed in claim 1, wherein the micro-controller generates a control signal coupled to control a current limit threshold signal in the switching controller for a current limit of the output current; the switching controller generates the switching signal in accordance with the current limit threshold signal.

13. The circuit as claimed in claim 12, wherein the current limit threshold signal will be reset to an initial value if the control signal is not generated in time.

14. The circuit as claimed in claim 12, wherein the current limit threshold signal will be reset to an initial value in response to a power-on of the power supply.

15. The circuit as claimed in claim 1, wherein the switching controller is coupled to detect the output voltage by detecting a reflected signal of the transformer.

16. The control circuit of claim 1 wherein the control circuit is configured to vary the feedback signal in response to a change in the output current.

17. The control circuit of claim 1 wherein the control circuit is configured to adjust the voltage-reference signal in accordance with the output voltage and to adjust the current-reference signal in accordance with the output current.

18. The control circuit of claim 1 wherein the micro-controller is configured to read a value of the output voltage and read a value of the output current.

19. A control circuit for a power supply, comprising:
a reference generation circuit configured to generate a voltage-reference signal and a current-reference signal for regulating an output voltage and an output current of the power supply;
a feedback circuit configured to detect the output voltage and the output current for generating a feedback signal in accordance with the voltage-reference signal and the current-reference signal;
the control circuit configured to be coupled to a secondary side of the power supply, the control circuit configured to provide the feedback signal for use by a switching controller on a primary side of the power supply wherein the switching controller is configured to generate a switching signal to switch a transformer for generating the output voltage and the output current in accordance with the feedback signal;
a micro-controller coupled to control the reference generation circuit; wherein the micro-controller, the reference generation circuit, and the feedback circuit are equipped in the secondary side of the transformer; and
wherein the voltage-reference signal and the current-reference signal will be reset to an initial value in response to a power-on of the power supply.

20. A control circuit for a power supply, comprising:
a reference generation circuit configured to generate a voltage-reference signal and a current-reference signal for regulating an output voltage and an output current of the power supply;
a feedback circuit configured to detect the output voltage and the output current for generating a feedback signal in accordance with the voltage-reference signal and the current-reference signal;
the control circuit configured to be coupled to a secondary side of the power supply, the control circuit configured to provide the feedback signal for use by a switching controller on a primary side of the power supply wherein the switching controller is configured to generate a switching signal to switch a transformer for generating the output voltage and the output current in accordance with the feedback signal;
a micro-controller coupled to control the reference generation circuit; wherein the micro-controller, the reference generation circuit, and the feedback circuit are equipped in the secondary side of the transformer wherein the micro-controller is configured to generate a control signal formed to control an over-voltage threshold signal in the switching controller for an over-voltage protection of the output voltage and wherein the over-voltage threshold signal will be reset to an initial value in response to a power-on of the power supply.

* * * * *